UNITED STATES PATENT OFFICE.

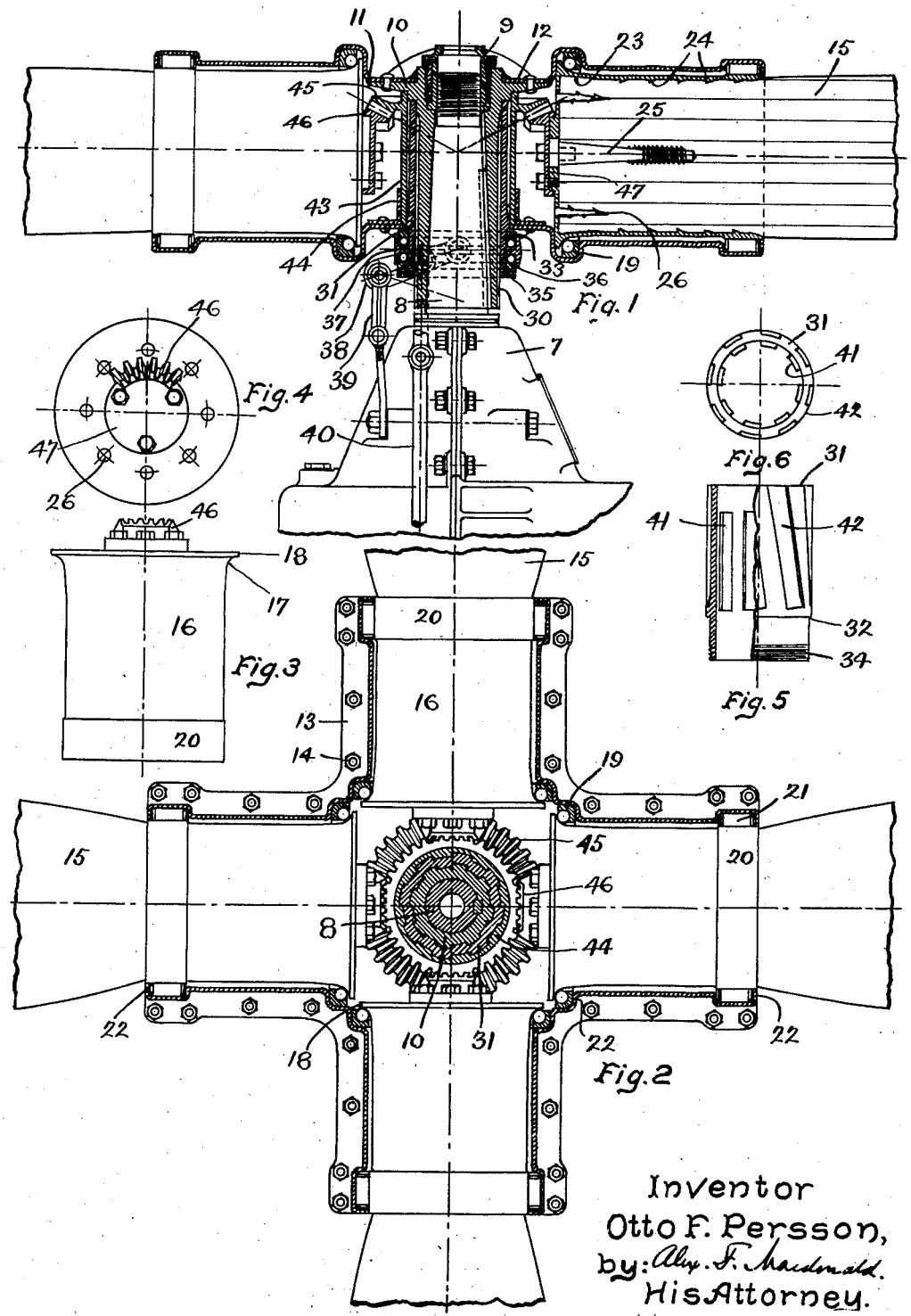

OTTO F. PERSSON, OF ERIE, PENNSYLVANIA.

VARIABLE-PITCH PROPELLER.

1,406,277.  Specification of Letters Patent.  Patented Feb. 14, 1922.

Application filed January 24, 1920. Serial No. 353,703.

*To all whom it may concern:*

Be it known that I, OTTO F. PERSSON, a citizen of the United States, residing at Erie, county of Erie, State of Pennsylvania, have invented certain new and useful Improvements in Variable-Pitch Propellers, of which the following is a specification.

The present invention relates to variable pitch propellers and especially to those intended for use on air crafts, and has for its object to improve their construction to the end that the blades may, by the expenditure of a reasonable amount of power, be turned to change their pitch while the propeller is rotating at high speed and performing work. A further object of the invention is to provide improved means whereby the reaction of the blades is prevented from being transmitted to the adjusting mechanism.

For a consideration of what I believe to be novel and my invention, attention is directed to the accompanying description and claims appended thereto.

In the drawing which illustrates one of the embodiments of my invention, Fig. 1 is a view largely in section through a propeller hub and its blades; Fig. 2 is a partial end view of a four bladed propeller showing certain of the actuating parts in section. Fig. 3 is a view in elevation of one of the metallic ferrules in which each blade is seated; Fig. 4 is a plan view of the same; Fig. 5 is a view partly in elevation and partly in section of the sleeve which turns the blades on their axes, and Fig. 6 is a plan view thereof.

7 indicates one end of a well-known type of internal combustion engine and 8 the tapered crank shaft thereof. Keyed on the shaft and held against endwise movement by the sleeve and nut 9 is the hub 10 of the propeller. Near its outer end the hub has a flange 11 to which is secured the casing 12, the latter being adapted the receive the inner ends of the blades. In other words, the casing has sockets for receiving the blades of which there may be two or more, four being illustrated. The casing is made in two principal parts and preferably of pressed steel, there being a flange 13 on each part adjacent the plane of division through which a number of bolts 14 extend to securely unite them. A casing constructed in this manner is extremely strong and simple to manufacture. It is divided in the manner indicated so that the blades can readily be assembled in place or removed. The casing can be designed to receive any reasonable number of blades 15, four being shown in the drawing. The mounting for each blade is similar so a description of one will suffice. On the inner end of each blade is a steel ferrule 16, the latter having a well rounded surface 17 at its inner end which terminates in a flange 18. This rounded surface forms part of the race of a ball-bearing which bearing receives the heavy strain on the blade due to centrifugal force. By preference this ball or thrust bearing is closed to the shaft where the radius is small since by so doing the stresses due to centrifugal force can be kept within a reasonable amount. By using the ferrule to form a part of the bearing the number of parts is decreased and the manufacturing operation simplified. The other part of the race comprises an annular member 19 substantially L-shaped in cross section, which is seated in a corresponding shouldered recess formed in the casing. The outer portion 20 of the ferrule is somewhat larger in diameter than the intermediate part and is ground true to form a bearing surface for the rollers 21, the latter being seated in an annular shouldered recess in the casing and extending parallel with the axis of the blade. The purpose of these rollers is to take the side thrust of the blade when in service. It will be noted that the shape of these ball and roller containing parts of the casing is such as to form stiffening ribs thereby greatly strengthening the casing. This is chiefly due to the fact that a portion of the metal of each rib, as 22 for example, extends perpendicular to the cylindrical part of the casing. It will be noted that the diameter of the inner end of the ferrule is greater than that of the casing beyond the ball race 19. As a result of this the blade cannot be pulled out of the casing even though the balls were injured for any reason. It is also to be noted that each blade is supported so as to turn freely on its axis in response to the actuating means which will be described later.

For a short distance from the inner end of the ferrule its diameter is tapered or enlarged toward the inner end to form a socket to prevent the blade from pulling out. This is done by beveling or tapering the inner wall as at 23. Additional anchoring means are afforded by the saw tooth projections, ribs or ridges 24, which may be annular or only partially so. In assembling the steel ferrule is expanded by heat, care being exercised not to get it hot enough to burn the laminated wood of the blade 15. The blade end is then heated to shrink it and the two are forced together. After the blade is well seated in the ferrule an expanding bolt 25 having a coarse thread of the wood screw type is screwed into place which causes the inner end of the blade to enlarge and fill the socket. This screw or bolt is prevented from backing out by the gear which is secured to the ferrule. As additional means for securing the blade wedges 26 may be driven into the end of the blade.

The actuating means for turning the blades will now be described. The hub which supports the casing has a conical bore and is keyed to the main shaft 8 of the engine. The periphery of the hub is cylindrical and has a number of axially extending grooves 30 which are parallel to each other but angularly displaced. Surrounding the hub is a sleeve 31 which has a shoulder 32, Fig. 5, upon which is seated one member of the double acting thrust bearing 33. The sleeve is also screw threaded at 34 to receive the nut 35, the latter engaging a thrust disk 36 forming a part of the thrust bearing. The nut is held in place by any suitable form of locking means. Between the rows of balls is a thrust ring 37 which is moved to and fro by the lever 38 mounted at one end on a swinging support 39 and an actuating rod and link 40. This rod may be moved by any suitable means.

The interior of the sleeve is provided with a plurality of broad, straight splines 41 which fit into the grooves 30 in the hub and permit it to be moved back and forth by the actuating rod 40 without, however, changing its angular position with respect to the crank shaft and hub. On the periphery of the sleeve is a plurality of broad spiral splines 42 as best shown in Figs. 5 and 6, there being eight in the present illustration. By preference both the inside straight splines and the outside spiral splines are made integral with the sleeve since by so doing their exact positioning can be assured and they can be very accurately machined with a minimum amount of fitting. This arrangement also has the advantage of providing large wearing surfaces and avoiding the use of loose parts. Surrounding the sleeve and located within the casing is a tubular member 43 which is supported at its ends by suitable bearing surfaces formed on the actuating sleeve 31 and parts of the hub. Surrounding the member at its inner end, the one adjacent the engine, is a flanged ring 44 which serves to reinforce the casing. The inside or bore of the member is provided with as many spiral slots as there are external splines on the sleeve 31, the arrangement being well illustrated in Fig. 2. Formed as a separate or integral part of the annular member is a beveled gear 45 which in turn meshes with segmental bevel gears 46, there being one such gear for each blade. The segmental gears are secured to the respective ferrules of the blades by suitable bolts. In addition, each gear has a central recess which fits over a raised shoulder 47 on the ferrule which serves as a centering means.

From the foregoing it will be seen that as the sleeve moves toward and away from the engine in a straight line due to the straight splines 41, that the spiral splines 42 engaging the tubular member will oscillate the latter in one direction or the other depending upon the direction of movement of the sleeve. Axial movement of the sleeve is thus transformed into circular movement of the member and with it the bevel gear 45 which in turn moves the blades about their axes to change their pitch. The angles of the spiral splines 42 and co-operating grooves are so chosen that while the sleeve can turn the blades the blades cannot by their reaction when in action move the sleeve. This is important since otherwise it would be very difficult to change the pitch of blades when in action and rotating at high speed.

The construction has the advantage of simplicity and great mechanical strength. Such parts as there are are comparatively few in number and do not require special machine work nor undue accuracy in their manufacture. The propeller may be of the "tractor" type as shown or of the "pusher" type. To assemble the parts as a "pusher" type the gears on the member are reversed and those in the blades assembled 180° from their present positions. The fact that the sleeve has a straight line motion as distinguished from an angular or combined straight line and angular makes the actuating mechanism such as 40 and associated parts very simple.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a propeller, the combination of a hub adapted to be secured to the driving shaft, a casing secured to the hub, blades carried by the casing, a tubular member which surrounds the hub, a sleeve arranged between the hub and member and in telescopic relation thereto, straight and spiral splines, certain of which are between the hub and sleeve and the others between the sleeve and tubular member, and means for moving the sleeve along the hub to cause angular movements of the blades on their axes.

2. In a propeller, the combination of a hub, a casing carried thereby, blades mounted in the casing and adapted to be moved about their axes to change their pitch, a tubular member, gearing between the member and the blades, a sleeve which has a straight line motion and is located between the hub and member for turning the latter, splines between the hub and sleeve, other splines between the sleeve and member, and means for moving the sleeve on the hub to cause angular movements of the blades.

3. In a propeller, the combination of a hub, a casing carried thereby, blades mounted in the casing, a thrust and guide bearing for each blade carried by the casing, a gear attached to each blade for turning it about its axis, a tubular member which carries a gear that meshes with all of the gears attached to the blades, a sleeve which has a straight line motion, is supported by the hub and is located between it and the member, straight splines between the sleeve and hub, spiral splines between the sleeve and member, and means for moving the sleeve along the hub to cause angular movements of the blades.

4. In a propeller, the combination of a hub, a casing carried thereby, two or more blades, a ferrule for the inner end of each blade which is provided with an enlarged inner end to form part of a thrust bearing and a finished outer end to form part of a guide bearing, other bearing members carried by the casing and co-operating with those of the ferrule, a gear attached to each ferrule, a tubular member, a gear which surrounds the member and is actuated thereby, a sleeve which is guided on the hub and has a straight line motion, means between the sleeve and hub to prevent relative rotation thereof, other means between the sleeve and member for transforming axial movements of the sleeve into angular movement of the member, and means for moving the sleeve axially.

5. In a propeller, the combination of a hub, a casing carried by the hub which is made in two principal parts, the plane of division being perpendicular to the axis, said parts having enlarged recesses, blades each of which has a ferrule with a flanged inner end located in one of the recesses, means for securing each blade in its ferrule, anti-friction bearings located in the recesses and engaging the ferrules, a beveled gear attached to each ferrule, a tubular member which is concentric with the hub, a beveled gear carried by one end of the member which meshes with those on the ferrules, a sleeve located between the hub and member, splines between the hub and sleeve, other splines between the sleeve and member whereby movements of sleeve on the hub cause angular movements of member, and means for moving the sleeve on the hub.

6. In a propeller, the combination of a hub, a casing carried thereby, blades which are anchored in the casing against centrifugal stresses and are capable of angular adjustment to change their pitch, a tubular member, gearing between the member and the blades, a sleeve located between the hub and member which has integral splines on its inner surfaces engaging slots in the hub and integral splines on its periphery engaging corresponding slots in the inner wall of the member to cause angular movement of the member, and means for moving the sleeve axially.

7. In a propeller, the combination of a hub which has a central bore to receive the driving shaft and a flange at one end, a pressed metal casing made in two principal parts with flanges along the plane of division to receive clamping bolts, means for securing the casing to the flange, blades carried by the casing and arranged to turn therein on their axes, a sleeve splined to the hub, a tubular member splined to the outside of the sleeve, gearing between the member and the blades for turning them, a ring which is attached to the casing and surrounds the member and in which the member is free to turn, and means for adjusting the sleeve axially.

8. In a propeller, the combination of a hub, a casing composed of two principal parts, said parts having sockets to receive the blades, each socket having walls extending perpendicular to its axis to form strengthening ribs and bearing receiving recesses, a ferrule for each blade which has an enlarged flange at its inner end that is located in one of the inner recesses, said flange having a greater diameter than that of the body of the socket, thrust and guide bearings located in the recesses in each socket which engage the ferrule, means for anchoring each blade in its ferrule, gears carried by the ferrules for turning them in their bearings, gear means for turning said gears, and means for actuating said gear means.

9. In a propeller the combination of a hub, a casing mounted thereon and having blade receiving sockets and bearing receiving recesses, said casing being divided into two principal parts, the plane of division being perpendicular to the axis of the hub, means for uniting the parts of the casing, blades located in the sockets, a one piece ferrule for each blade which is located in a socket and has an enlarged flange as its inner end situated in a recess in the casing and a finished surface at its outer end, means for securing each blade in its ferrule, a thrust bearing carried by the inner end of each socket which engages said flange, and a guide bearing at its outer end which engages said finished surface.

10. In a propeller, the combination of a hub adapted to be secured to the driving shaft, a casing secured to the hub, blades carried by the casing, a tubular member which surrounds the hub, a sleeve arranged between the hub and member and in telescopic relation thereto, splines located between the hub and sleeve, other splines located between the sleeve and member, and means for moving the sleeve to cause said splines to turn the blades in their axes to change their pitch.

11. In a propeller, the combination of a hub adapted to be secured to the driving shaft, a casing secured to the hub, blades carried by the casing, a tubular member which surrounds the hub, gearing for transmitting motion from the member to the blades, a sleeve located between the hub and member, splines arranged internally and externally with respect to the sleeve and cooperating with the hub and member for causing relatively angular movement of the member with respect to the hub, and means for moving the sleeve.

In witness whereof, I have hereunto set my hand this 21 day of January, 1920.

O. F. PERSSON.